A. R. ENCINAS.
LOCK NUT.
APPLICATION FILED AUG. 1, 1912.

1,090,976.  Patented Mar. 24, 1914.

WITNESSES
Edw. Gonzales
Wode W. Moore

INVENTOR
Arthur R. Encinas

UNITED STATES PATENT OFFICE.

ARTHUR R. ENCINAS, OF SAN FRANCISCO, CALIFORNIA.

LOCK-NUT.

1,090,976.  Specification of Letters Patent.  Patented Mar. 24, 1914.

Application filed August 1, 1912. Serial No. 712,813.

*To all whom it may concern:*

Be it known that I, ARTHUR R. ENCINAS, a citizen of the United States, residing at San Francisco, in the county of San Francisco and State of California, have invented a new and useful Lock-Nut, of which the following is a specification.

This invention relates to new and useful improvements in nut locks and more particularly to a sectional nut lock, the object of the invention being to provide a nut having means for engagement with the sub-structure to which the bolt is applied to prevent turning movement of the nut and is further provided with means for releasing said engaging means when it is desired to remove the nut from the bolt.

Another object of the invention is the provision of a nut lock including a male and a female section, the male section thereof being provided with engaging points adapted for engagement with the sub-structure to securely hold the nut against turning movement and further including a female section movably mounted upon the male section and adapted to engage the sub-structure when it is desired to remove the nut to release the engaging means carried by the male section and permit turning movement of the nut.

A further object of the invention is the provision of a nut lock of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claims and shown in the accompanying drawings, in which—

Figure 1:
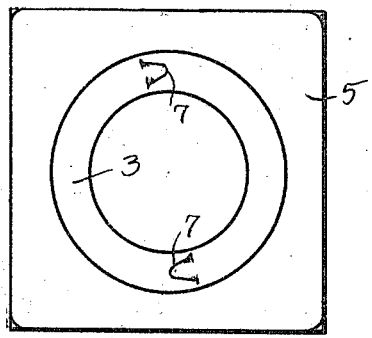
Figure 2:
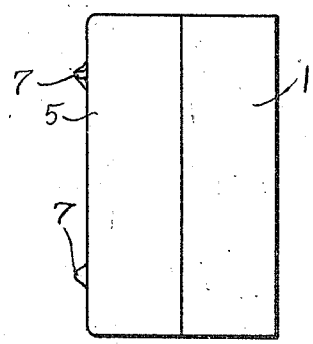
Figure 3:
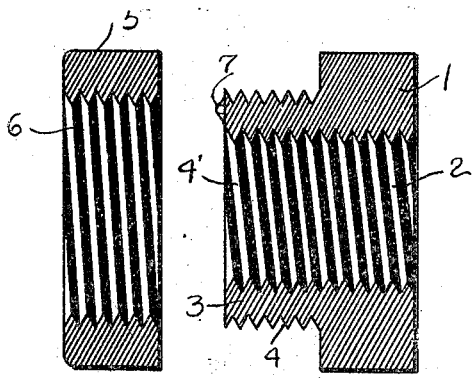
Figure 4:
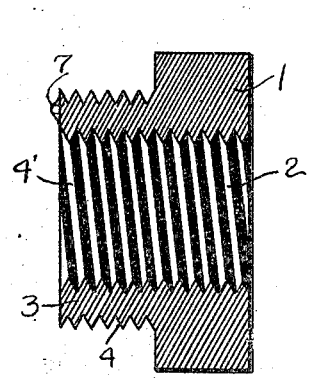
Figure 5:
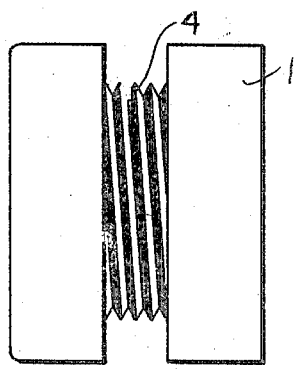

Figure 1 is an end elevation of my improved nut lock; Fig. 2 is a side elevation showing the same in its operative position; Fig. 3 is a longitudinal sectional view of the female section; Fig. 4 is a similar view of the male section; Fig. 5 is a side elevation illustrating the position of the female section when it is desired to release the nut.

Referring more particularly to the drawings, 1 indicates the male section of my improved nut lock, which includes a substantially rectangular body member internally threaded, as shown at 2, and provided upon one side thereof with an integrally formed sleeve 3 threaded upon its exterior and its interior, as shown at 4 and 4'. It will be readily understood that the interior threads 2 and 4' of the male section 1 are adapted for engagement with a bolt which has been previously passed through the sub-structure to which the nut is to be applied.

In Fig. 3, I have illustrated a longitudinal sectional view of the female section 5 of my improved nut lock. This section comprises a rectangular body member or any other suitable form desired, the interior of which is threaded, as shown at 6, said threads being adapted for engagement with the exterior threads 4 formed upon the sleeve 3 whereby the female section 5 is movably engaged with the male section 1. The end of the sleeve 3 opposite the body 1 is provided with diametrically opposite tapering engaging points 7, which, when the nut is screwed home upon the bolt, will engage the sub-structure to which the bolt is applied and prevent backward turning movement of the nut.

Before applying the nut lock to the bolt, the female section 5 is threaded upon the sleeve 3 until the outer faces of the sleeve and the female section are flush, thus permitting the nut to be screwed up nearly tight with said sub-structure. When it is desired to remove the nut, the female section 5 is screwed from the sleeve 3 toward the sub-structure engaging the sub-structure and forcing the male section 1 backward, thus disengaging the engaging points 7 from the sub-structure sufficiently to permit backward rotary movement of the nut. It will be readily understood that should the nut lock be applied to a steel surface, the engaging point 7, which will be constructed of tempered steel, will not permit the nut to be screwed tightly against the sub-structure, thus leaving sufficient space between the end of the male section and the sub-structure so that when the female portion is advanced toward the sub-structure, it will have greater movement to relieve the engaging points.

It is a well known fact that after a certain period of use, bolts generally become loosened and expand to a certain extent so that the nut which is threaded thereon is not as tight as it was when screwed home in the first place. It will, therefore, be readily apparent that when it is desired to release the nut from the bolt, the female section 5 of my improved nut lock may upon the advancement of the same toward the sub-structure force the male section 1 backward sufficient to release the engaging points 7. Should the nut lock be applied to a wooden surface, it will be readily understood that the points 7 will engage sufficiently deep in the sub-structure to permit the nut to be screwed tightly against the same. In releasing the nut from the wooden sub-structure, it will be readily apparent that in securing the female section 5 against the surface of the wooden sub-structure, it will not only force the nut backward but at the same time will press inwardly upon the wooden sub-structure so that the points 7 may be readily released. It is a well known fact that most all the different types of wood contain elasticity to a certain extent, thus permitting the operation, as above described.

From the foregoing description taken in connection with the accompanying drawings, it will be readily apparent that I have provided a simple and durable nut lock which may be quickly and readily applied to any form of bolt, and which is provided with engaging means adapted for engagement with the sub-structure to which the bolt is applied to prevent backward movement of the nut. It will also be apparent that my improved nut is provided with simple and durable means for releasing said engaging members when it is desired to remove the nut. The device as herein shown and described is thought to be extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A device of the class described including a male section adapted to removably engage the threaded end of the bolt, an internally and externally threaded sleeve formed integral with one face of the male section, engaging points formed upon the outer end of said sleeve for engagement with the sub-structure to prevent backward rotary movement of the nut, and a female section movably mounted upon said sleeve, as and for the purpose set forth.

2. A device of the class described including a male section comprising a body adapted to be removably engaged with the threaded end of a bolt, an internally and externally threaded sleeve formed integral with one face of the body, diametrically opposite engaging members formed upon the outer end of said sleeve, a female portion movably mounted upon the sleeve and having its outer face normally flush with the outer end of the sleeve and said female section being adapted for advancement against the sub-structure to which the bolt is applied to release said engaging points.

ARTHUR R. ENCINAS.

Witnesses:
  A. O. FLOWERS,
  EDW. GONZALES.